United States Patent [19]

Lassine

[11] 4,152,968
[45] May 8, 1979

[54] FASTENING PLUG

[76] Inventor: Guy Lassine, 60, rue de Stalle, 1180 Brussels, Belgium

[21] Appl. No.: 857,883

[22] Filed: Dec. 6, 1977

[30] Foreign Application Priority Data

Nov. 12, 1977 [BE] Belgium .................... 0182861

[51] Int. Cl.² .............................................. F16B 13/10
[52] U.S. Cl. ..................................................... 85/71
[58] Field of Search .................... 85/3 K, 3 S, 69, 70, 85/71

[56] References Cited

U.S. PATENT DOCUMENTS

| 330,119 | 11/1885 | Holden | 85/71 |
|---|---|---|---|
| 1,295,734 | 2/1919 | Greubel | 85/71 |
| 2,520,375 | 8/1950 | Roe | 85/69 X |
| 2,897,694 | 8/1959 | Carney | 85/3 S X |
| 3,143,916 | 8/1964 | Rice | 85/71 |
| 3,213,746 | 10/1965 | Dwyer | 85/3 R X |
| 3,348,444 | 10/1967 | Brignola | 85/70 |
| 3,942,407 | 3/1976 | Mortensen | 85/71 |

FOREIGN PATENT DOCUMENTS 1305222  4/1962  France ........................ 85/3 R Primary Examiner—Thomas J. Holko
Attorney, Agent, or Firm—Scully, Scott, Murphy & Presser

[57] ABSTRACT

There is described a fastening plug which comprises a substantially cylindrical portion with a center bore, ending in a collar which will bear on a surface of said wall, said cylindrical portion being extended by at least two outer wings which are joined at the opposite plug end, while two inner wings which are joined at the free end thereof and face said cylindrical portion, are so provided that a tightening member screwed into said bore and also going through those bores provided where said outer and inner wings meet, causes said outer wings to distort outwards as an overthickness to thus insure the locking of the plug on the wall.

4 Claims, 3 Drawing Figures

FIG. 1
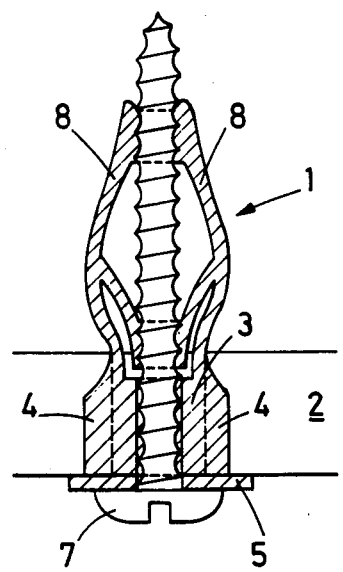
FIG. 2
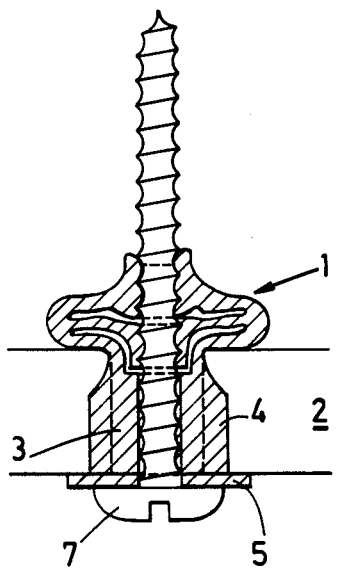
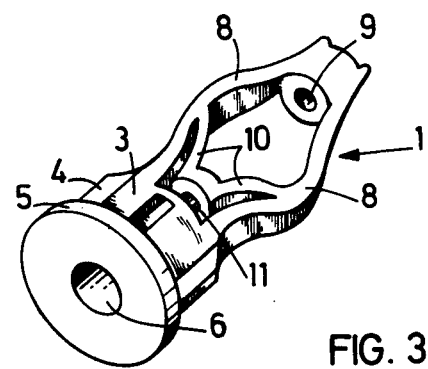
FIG. 3

FASTENING PLUG

This invention relates to a plug for fastening objects to a wall.

Actually the plug according to the invention has been designed for fastening by means of a screw, all kinds of objects whatever the shape thereof, to low-thickness walls. By low-thickness walls there should be understood here any wall which is not thick enough for a plug fitted into a hole or boring provided in said wall, to be locked therein simply by the distortion of said plug engaging the single bore or hole provided in such a wall. In practice the walls concerned by the present patent application are those walls with the thickness comprised between 3 and 13 mm approximately.

It has already been proposed to use plugs with the feature of being completely distortable outside the wall to lock the plug on said wall. Metal plugs and plugs from distortable material such as synthetic materials are known for example.

The known metal plugs have for drawback to be provided with a number of distortable wings integral with a cylindrical shaft which is fitted into a wall. The drawback with such metal plugs lies in the height of the cylindrical shaft having to be suited to the thickness of the wall to avoid an insufficient locking of the plug. As regards the known type of plugs from distortable synthetic material, they have to be distorted beforehand by means of a suitable tool to obtain the fish-shape thereof which is required to enter the hole provided for this purpose. The distortion which is then performed by screwing the fastening screw tight is not sufficient because the side wings of such plugs are driven to the center of said plug, that is into the boring provided in the wall instead of bearing sidewise thereon.

The invention has for object to obviate said drawbacks and to provide a plug for fastening objects to a wall which obtains a perfect locking of said plug on low-thickness walls by means of a distorting of the material the plug is made of.

For this purpose, the plug according to the invention comprises a substantially cylindrical portion with a center bore, ending in a collar which will bear on a surface of said wall, said cylindrical portion being extended by at least two outer wings which are joined at the opposite plug end, while two inner wings which are joined at the free end thereof and face said cylindrical portion, are so provided that a tightening member screwed into said bore and also going through those bores provided where said outer and inner wings meet, causes said outer wings to distort outwards as an overthickness to thus insure the locking of the plug on the wall.

Other details and advantages of the invention will stand out from the description which will be given hereinafter by way of non limitative example and with reference to the accompanying drawings, in which:

FIG. 1 is a lengthwise cross-section through a plug according to the invention, in undistorted condition.

FIG. 2 is a lengthwise cross-section showing the distorted plug as it is forcefully pushed against a wall.

FIG. 3 is a perspective view of a plug according to the invention.

The plug shown in the figures is designed as already stated, for the fastening of objects to low-thickness walls, that is, walls with such a thickness that a plug cannot distort inside the bore of the hole provided in the wall.

It will be noted by reference to the figures that the plug 1 goes completely through the wall 2 and that the total length thereof is thus substantially longer than the thickness of said wall.

At the bottom thereof the plug has a substantially cylindrical portion 3 provided with wings or ribs 4 which are provided to prevent the plug rotating relative to wall 2. The cylindrical portion 3 of said plug is provided with a collar 5 which will engage one surface, usually the outer surface of wall 2.

The plug is provided with a center bore 6 to let a tightening member such as a screw 7 through. As the plug according to the invention is made from a distortable material such as a synthetic material, it is not required to provide some screw-thread inside bore 6 as the thread of screw 7 bites into said distortable synthetic material.

In that portion thereof which will be distorted, the plug is of fish-shape and it is comprised of two outer wings 8 which join together at the free end thereof and which are provided there with a bore 9.

Inside the wings 8 are provided two inner wings 10 which join in the shape of a cylindrical portion which is also provided with a bore 11.

Such a plug, which is made from a flexible enough synthetic material, enters without any trouble the opening or bore provided for this purpose in the wall 2. If need be it can be pushed home with a screw-driver and once driven inside wall 2, the cylindrical plug portion 3 is anchored enough therein by means of the wings or ribs 4, to prevent any rotating of the plug during the screwing down of screw 7.

Said screw 7 besides going through above-mentioned bore 6, also goes through bores 11 and 9 where the screw thread also bites into the flexible synthetic material. This results during the screwing-down of the tightening member 7, in a progressive distortion, first in the shape of a bulb and then as an overthickness, of the outer wings 8 of the plug.

When the screw is screwed or tightened down, the plug is completely distorted to take the shape as shown in FIG. 2.

The inner wings 10 have been used to distort the fish-shaped portion of the plug during the screwing of the tightening member 7.

It is clear that the selection of the distortable synthetic material the plug is made of, is of great importance. Said material should first be rigid enough for the overthickness or distortion of the fish-shaped portion of the plug to have the required strength for locking said plug on the wall. On the other hand, said material should also be flexible enough for the fish-shaped portion to be narrowed by clamping between the fingers when introducing said plug into the wall and for the distortion under the clamping action of screw 7 not requiring too much force.

It must be understood that the invention is not limited to the above embodiments and that many changes can be brought therein without departing from the scope of the invention as defined in the appended claims.

For instance it would be possible to provide more than 2 outer or inner wings, but it has been shown that the plug as shown in the accompanying drawings has given very good results, much better than what can be expected from the plugs with distortable shaft known up to now.

I claim:

1. A plug for fastening an object to a wall, which comprises a substantially cylindrical portion with a center bore, ending in a collar which will bear on a surface of said wall, said cylindrical portion being extended by a least two outer wings which are joined at the plug end by a first central member having a central bore therethrough to receive a tightening member, while at least two inner wings extend from interior surfaces of said outer wings at approximately the mid-lengths thereof to a second central member having a central bore therethrough such that a tightening member screwed into said cylindrical portion and said first and second central members causes said inner wings to push outwardly against said outer wings to cause said outer wings to distort outwards as an overthickness to thus insure the locking of the plug on the wall.

2. Plug as defined in claim 1, in which said outer wings which are joined together at the plug free end, form together a fish-shaped body.

3. Plug as defined in claim 1, which is made from a distortable material.

4. Plug as defined in claim 3, in which said distortable material is a synthetic material.

* * * * *

UNITED STATES PATENT AND TRADEMARK OFFICE
CERTIFICATE OF CORRECTION

PATENT NO. : 4,152,968
DATED : May 8, 1979
INVENTOR(S) : Guy Lassine

It is certified that error appears in the above-identified patent and that said Letters Patent are hereby corrected as shown below:

On the title page, under [30] entitled Foreign Application Priority Data, delete "Nov. 12, 1977 [BE] Belgium ........... 0182861", and substitute therefor --

Dec. 6, 1976 Belgium Patent No. 849,096

Nov. 23, 1977 Belgium Patent Application No. PV.0/182.861 -- .

Signed and Sealed this

Twenty-fifth Day of December 1979

[SEAL]

Attest:

SIDNEY A. DIAMOND

Attesting Officer

Commissioner of Patents and Trademarks